(12) United States Patent
Sullivan et al.

(10) Patent No.: US 6,868,745 B2
(45) Date of Patent: Mar. 22, 2005

(54) SEAT RESTRAINT BUCKLE AND TENSION SENSING ASSEMBLY

(75) Inventors: Stuart S. Sullivan, Peru, IN (US); Phillip E. Kaltenbacher, II, Kokomo, IN (US); James F. Patterson, Greentown, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 254 days.

(21) Appl. No.: 10/140,086

(22) Filed: May 7, 2002

(65) Prior Publication Data

US 2003/0209088 A1 Nov. 13, 2003

(51) Int. Cl.[7] ................................................. G01L 1/26
(52) U.S. Cl. ................................................. 73/862.391
(58) Field of Search ...................... 73/862.391, 862.392, 73/862.393, 826, 862.318

(56) References Cited

U.S. PATENT DOCUMENTS

| | | | |
|---|---|---|---|
| 4,574,911 A | 3/1986 | North | |
| 4,742,886 A | 5/1988 | Sato | |
| 4,805,467 A | 2/1989 | Bartholomew | |
| 4,979,400 A | 12/1990 | Bartholomew | |
| 5,454,591 A | 10/1995 | Mazur et al. | |
| 5,590,904 A | 1/1997 | Ellis et al. | |
| 5,732,974 A | 3/1998 | Sayles | |
| 5,871,232 A | 2/1999 | White | |
| 5,960,523 A * | 10/1999 | Husby et al. | 24/633 |
| 5,960,903 A * | 10/1999 | Abels et al. | 180/315 |
| 5,965,827 A | 10/1999 | Stanley et al. | |
| 5,996,421 A | 12/1999 | Husby | |
| 6,081,759 A | 6/2000 | Husby et al. | |
| 6,161,439 A | 12/2000 | Stanley | |
| 6,205,868 B1 | 3/2001 | Miller | |
| 6,209,915 B1 | 4/2001 | Blakesley | |
| 6,230,088 B1 | 5/2001 | Husby | |
| 6,301,977 B1 | 10/2001 | Stojanovski | |
| 6,336,371 B1 | 1/2002 | O'Boyle | |
| 6,363,793 B2 | 4/2002 | O'Boyle | |
| 6,400,145 B1 | 6/2002 | Chamings et al. | |
| 6,454,304 B1 | 9/2002 | Steffens, Jr. | |
| 6,502,860 B1 | 1/2003 | Siegfried et al. | |
| 6,508,114 B2 | 1/2003 | Lawson | |
| 6,520,540 B1 | 2/2003 | Siegfried et al. | |
| 6,554,318 B2 | 4/2003 | Kohut et al. | |
| 6,605,877 B1 | 8/2003 | Patterson et al. | |
| 6,640,648 B2 * | 11/2003 | Chamings et al. | 73/826 |
| 2002/0104383 A1 | 8/2002 | Chamings et al. | |
| 2003/0024326 A1 | 2/2003 | Blakesley et al. | |

* cited by examiner

*Primary Examiner*—Edward Lefkowitz
*Assistant Examiner*—Corey D. Mack
(74) *Attorney, Agent, or Firm*—Scott A. McBain

(57) ABSTRACT

A seat restraint buckle and tension sensing assembly for a seat restraint system in a vehicle includes a buckle assembly having a housing for receiving a portion of a latch plate of the seat restraint system. The buckle assembly senses latching of the latch plate. The seat restraint buckle and tension sensing assembly also includes a tension sensing assembly disposed in the housing and cooperating with belt webbing of the seat restraint system for sensing a tension level in the seat restraint system.

28 Claims, 6 Drawing Sheets

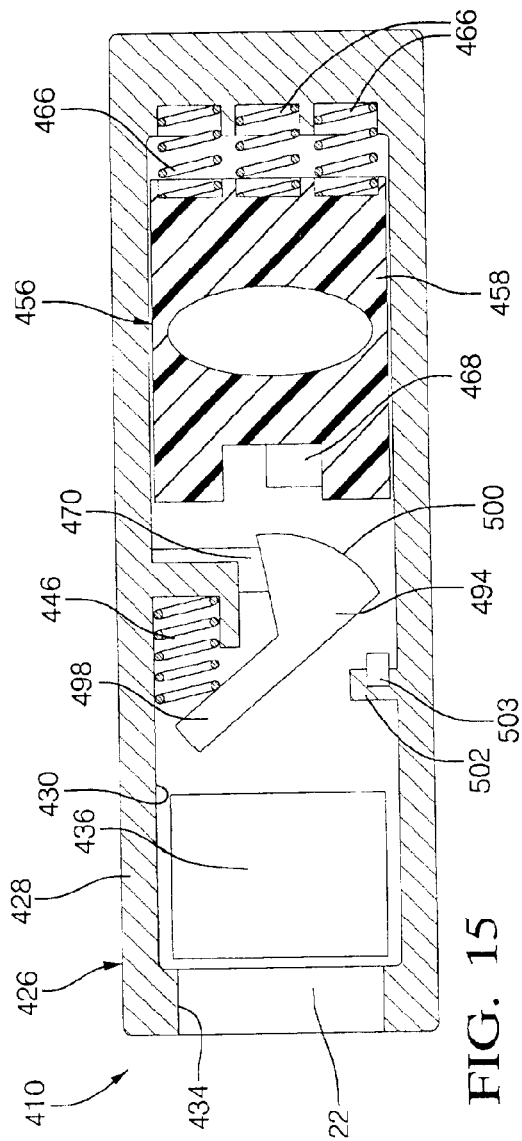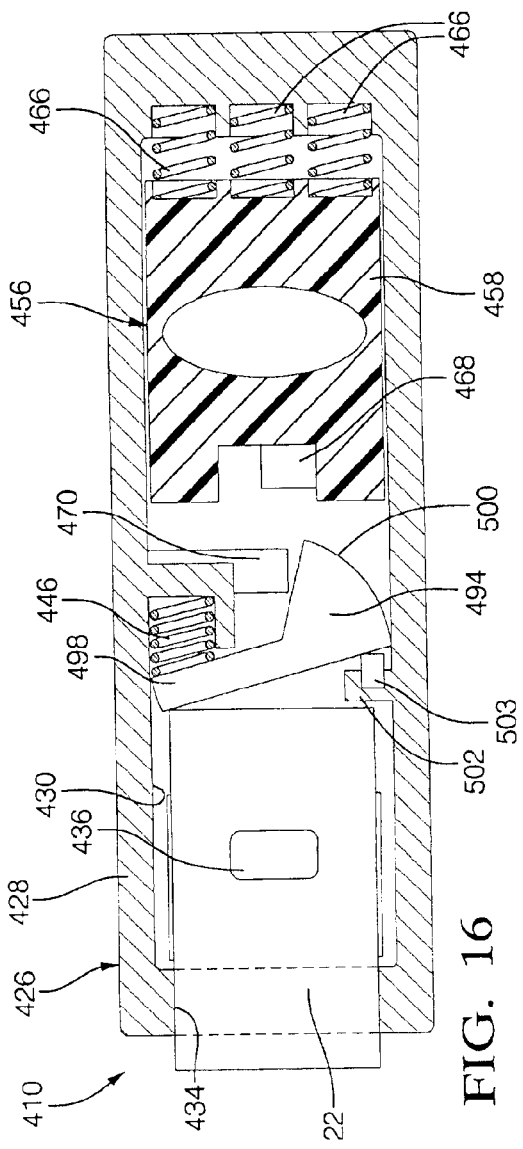

SEAT RESTRAINT BUCKLE AND TENSION SENSING ASSEMBLY

TECHNICAL FIELD

The present invention relates generally to seat restraint systems for vehicles and, more particularly, to a seat restraint buckle and tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraint.

Currently, vehicle manufacturers and suppliers have developed seat belt tension or switch monitoring devices to supplement information of the inflatable restraint system. However, several vehicles have interior architectures that do not lend themselves to mounting the seat belt tension sensor on the outboard floorpan or seat frame, and the inboard seat belt buckle side is a preferred location for the seat belt tension sensor for some applications. However, packaging a separate seat belt buckle latch and seat belt tension sensor presents a cumbersome challenge for interior designers.

Therefore, it is desirable to sense latching of a buckle for a seat restraint of a seat restraint system of a vehicle. It is also desirable to sense tension in a seat restraint of a seat restraint system of a vehicle. It is further desirable to integrate the seat belt buckle, the buckle sensor, and the seat belt tension sensor into a single monolithic sensor module to simply packaging. Therefore, there is a need in the art for a seat restraint and buckle tension sensing assembly that meets these desires.

SUMMARY OF THE INVENTION

It is, therefore, one object of the present invention to provide a seat restraint buckle and tension sensing assembly for a seat restraint system of a vehicle.

It is another object of the present invention to provide a seat restraint buckle and tension sensing assembly for sensing latching of and tension in a seat restraint system of a vehicle.

It is yet another object of the present invention to provide a seat restraint buckle and tension sensing assembly that integrates a seat belt buckle, buckle sensor, and seat belt tension sensor into a single monolithic sensor module.

To achieve the foregoing objects, the present invention is a seat restraint buckle and tension sensing assembly for a seat restraint system in a vehicle including a buckle assembly having a housing for receiving a portion of a latch plate of the seat restraint system. The buckle assembly senses latching of the latch plate. The seat restraint buckle and tension sensing assembly also includes a tension sensing assembly disposed in the housing and cooperating with belt webbing of the seat restraint system for sensing a tension level in the seat restraint system.

One advantage of the present invention is that a seat restraint buckle and tension sensing assembly is provided for a seat restraint system in a vehicle. Another advantage of the present invention is that the seat restraint buckle and tension sensing assembly senses tension in the seat restraint system to help identify what is occupying the seat, either a child, child seat, or low mass adult. Yet another advantage of the present invention is that the seat restraint buckle and tension sensing assembly has wire routing that follows industry practice and has improved electrical connection. Still another advantage of the present invention is that the seat restraint buckle and tension sensing assembly is mounted to a seat restraint buckle of the seat restraint system and provides seat belt latching verification and communication with seat belt tension sensing. A further advantage of the present invention is that the seat restraint buckle and tension sensing assembly integrates the seat belt buckle, the buckle sensor, and the seat belt tension sensor into a single monolithic sensor module, thereby simplifying packaging. Yet a further advantage of the present invention is that the seat restraint buckle and tension sensing assembly combines discrete measurement of the seat belt latch positive engagement and the analog measurement of the seat belt tension into a compact monolithic integral sensor component. Still a further advantage of the present invention is that the seat restraint buckle and tension sensing assembly uses wiring interfaces of common supply and ground leads, eliminating multiple harnesses and leads. Another advantage of the present invention is that the seat restraint buckle and tension sensing assembly reduces cost by using fewer wire leads and smaller connectors, and simplifies wire routing, installation, service, and interior design.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 15 is a fragmentary elevational view of a further embodiment, according to the present invention, of the seat restraint buckle and tension sensing assembly of FIG. 1 illustrating a pre-latched condition.

FIG. 16 is a view similar to FIG. 15 illustrating the seat restraint buckle and tension sensing assembly in a latched condition.

DESCRIPTION OF THE PREFERRED EMBODIMENT

Figure 1:
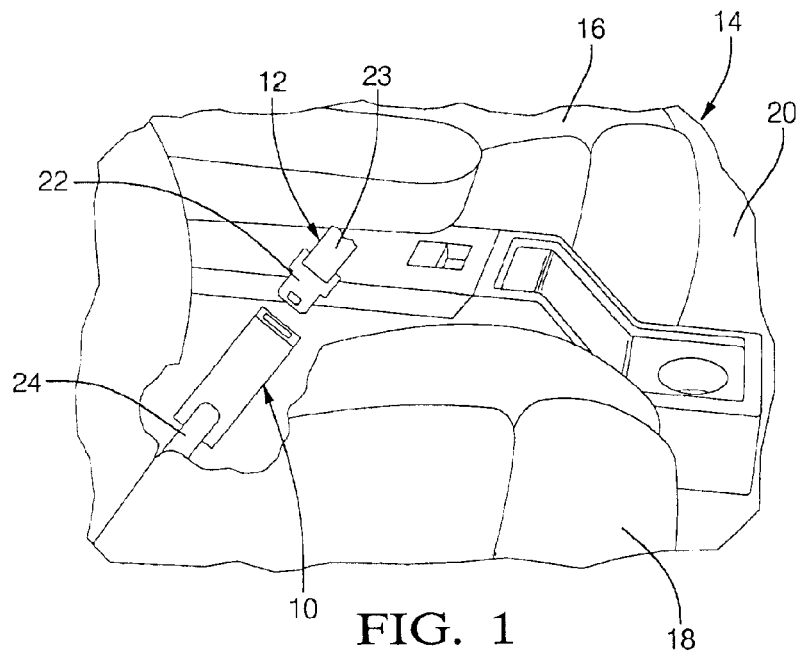
FIG. 1 is a perspective view of seat restraint buckle and tension sensing assembly, according to the present invention, illustrated in operational relationship with a seat restraint system of a vehicle.

Referring to the drawings and in particular FIG. 1, one embodiment of a seat restraint buckle and tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure (not shown) such as a floorpan in an occupant compartment 20 of the vehicle body 16. In this embodiment, the seat 18 is a front seat of the vehicle 14. It should be appreciated that the seat 18 could be a rear, second row, or third row seat for the vehicle 14.

Figure 2:
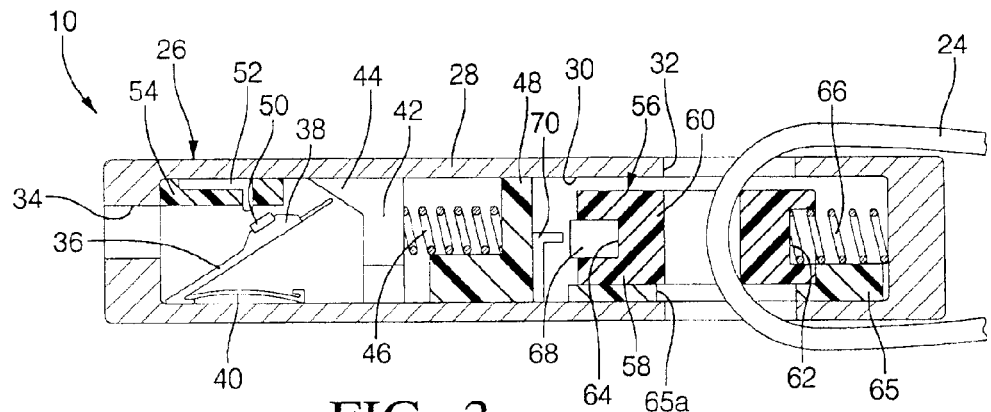
FIG. 2 is a fragmentary elevational view of the seat restraint buckle and tension sensing assembly of FIG. 1 illustrating a pre-latched condition.
Figure 3:
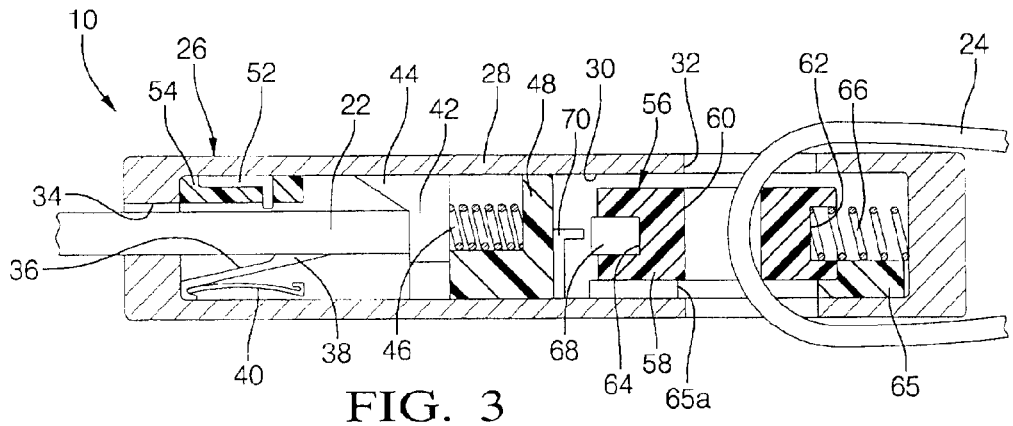
FIG. 3 is a view similar to FIG. 2 illustrating the seat restraint buckle and tension sensing assembly in a latched condition.

Referring to FIGS. 1 through 3, the vehicle 14 includes the seat restraint system 12 for restraining an occupant (not shown) in the seat 18. The seat restraint system 12 includes a latch tongue or plate 22 connected to an end of either one of a lap belt, shoulder belt, or both 23 which have another end connected to a retractor (not shown). The seat restraint system 12 also includes the seat restraint buckle and tension sensing assembly 10 connected by suitable means such as belt webbing 24 to vehicle structure. It should be appreciated that the latch plate 22 is engageable and disengageable with the seat restraint buckle and tension sensing assembly 24. It should also be appreciated that, except for the seat restraint buckle and tension sensing assembly 10, the seat restraint system 12 and vehicle 14 are conventional and known in the art.

Referring to FIGS. 2 and 3, the seat restraint buckle and tension sensing assembly 10, according to the present invention, includes a buckle assembly 26. The buckle assembly 26 has a housing 28 extending longitudinally. The housing 28 has a cavity 30 therein and an aperture 32 extending therethrough and communicating with the cavity 30 to allow belt webbing 24 to extend therethrough. The housing 28 has a forward open end 34 extending axially therein and communicating with the cavity 30 to receive a portion of the latch plate 22. The housing 28 is made of a rigid material such as metal.

The buckle assembly 26 also includes a release or push button (not shown) mounted to the housing 28 for movement with respect thereto. The buckle assembly 26 includes a movable latching pawl or locking member (not shown) connected to the housing 28. The locking member moves between a latched or buckled position in which an integral dependent lock bar (not shown) engages or is disposed in an aperture of the latch plate 22 and an unlatched or unbuckled position in which the lock bar is disposed out of or disengages the aperture in the latch plate 22. The buckle assembly 26 also includes a spring (not shown) such as a helical coil spring, which is located between the locking member and the housing 28 to urge the lock bar into the latch plate 22.

The buckle assembly 26 also includes a movable latch member 36 disposed in the cavity 30. The latch member 36 extends longitudinally and has a latch portion 38 disposed between the ends thereof. The latch portion 38 is generally arcuate in shape for a function to be described. The latch member 36 has one end contacting the housing 28 and extends upwardly at an angle to the other end. The latch member 36 is made of a rigid material such as metal.

The buckle assembly 26 includes at least one spring 40 disposed in the cavity 30 of the housing 28 to urge the latch member 36 upwardly. The spring 40 is of a leaf type and has one end connected to the latch member 36 and the other end contacting the housing 28. The spring 40 is made of a spring material such as metal.

The buckle assembly 26 includes a movable slider 42 disposed in the cavity 30 of the housing 28. The slider 42 is generally rectangular in shape and has flange portion 44 extending longitudinally forward toward the open end 34 of the housing 28. The slider 42 is made of a rigid material such as plastic.

The buckle assembly 26 includes at least one spring 46 disposed in the cavity 30 to urge the slider 42 forward to engage the latch member 36 for a function to be described. The spring 46 is of a coil type. The spring 46 is disposed between the slider 42 and a wall 48 of the housing 28. The spring 46 is made of a spring material such as metal.

The buckle assembly 26 includes at least one magnet 50 disposed in the cavity 30 of the housing 28. The magnet 50 is connected to the latch member 36 and disposed on the latch portion 38 thereof. The buckle assembly 26 includes at least one Hall effect sensor 52 disposed in the cavity 30 of the housing 28 and spaced from the magnet 50. The Hall effect sensor 52 is of a discrete type. The Hall effect sensor 52 is located at a top and forward end of the cavity 30 and attached to the housing 28 by suitable means. It should be appreciated that the position of the magnet 50 relative to the Hall effect sensor 52 changes the output current of the Hall effect sensor 52. It should also be appreciated that the Hall effect sensor 52 is mounted on a circuit board 54 connected to the housing 28 and is potted and connected by electrical leads or wires (not shown) to a source of power to be described in connection with FIG. 4.

The seat restraint buckle and tension sensing assembly 10 includes a tension sensing assembly, generally indicated at 56, disposed within the cavity 30 of the housing 28. The tension sensing assembly 56 includes a movable actuator 58 disposed in the cavity 30 of the housing 28 adjacent springs 66 to be described for cooperating with the springs 66. The actuator 58 is generally rectangular in shape and extends laterally and longitudinally. The actuator 58 has an aperture 60 extending therethrough to allow the belt webbing 24 to extend therethrough. The actuator 58 has a first cavity 62 in one longitudinal end and a second cavity 64 in the other longitudinal end for a function to be described. The actuator 58 is made of a rigid material such as plastic. It should be appreciated that, as the tension is increased in the belt webbing 24, the contact force of the actuator 58 increases.

The tension sensing assembly 56 may include a support or bearing plate 65 disposed between the actuator 58 and the housing 28 and having an aperture 65a extending therethrough to allow the belt webbing 24 to extend therethrough. The bearing plate 65 is made of a rigid material such as plastic.

The tension sensing assembly 56 includes at least one, preferably a plurality of springs 66 disposed in the cavity 30 of the housing 28 and cooperating with the actuator 58. The springs 66 are of a coil type. The springs 66 are spaced laterally and cooperate with the actuator 58 and are arranged to provide balance to the actuator 58. The springs 66 are made of a spring material. The springs 66 are tuned to a predetermined force such as for comfort or low tension in the seat restraint system 12. The springs 66 have one end disposed in the first cavity 62 and extend longitudinally to contact the wall of the housing 28. The springs 66 may also be of a leaf type. It should be appreciated that the springs 66 are arranged to prevent internal tipping of the actuator 58. It should also be appreciated that actuator 58 moves as the springs 66 are compressed.

The tension sensing assembly 56 includes at least one, preferably a plurality of magnets 68 disposed in the second cavity 64 of the actuator 58. The magnets 68 are spaced laterally and connected to the actuator 58 by suitable means. It should be appreciated that the magnets 68 are more preferably a pair of magnets 68 permanently mounted in the spring-tensioned actuator 58.

The tension sensing assembly 56 includes at least one Hall effect sensor 70 disposed in the cavity 30 of the housing 28 and spaced longitudinally from the magnets 68. The Hall effect sensor 70 is of an analog type. It should be appreciated that the position of the magnets 68 relative to the Hall effect sensor 70 changes the output current of the Hall effect sensor 70. It also be appreciated that the Hall effect sensor 70 is mounted on a circuit board (not shown) connected to the wall 48 of the housing 28 and are potted and connected by electrical leads or wires to a source of power to be described in connection with FIG. 4.

Figure 4:
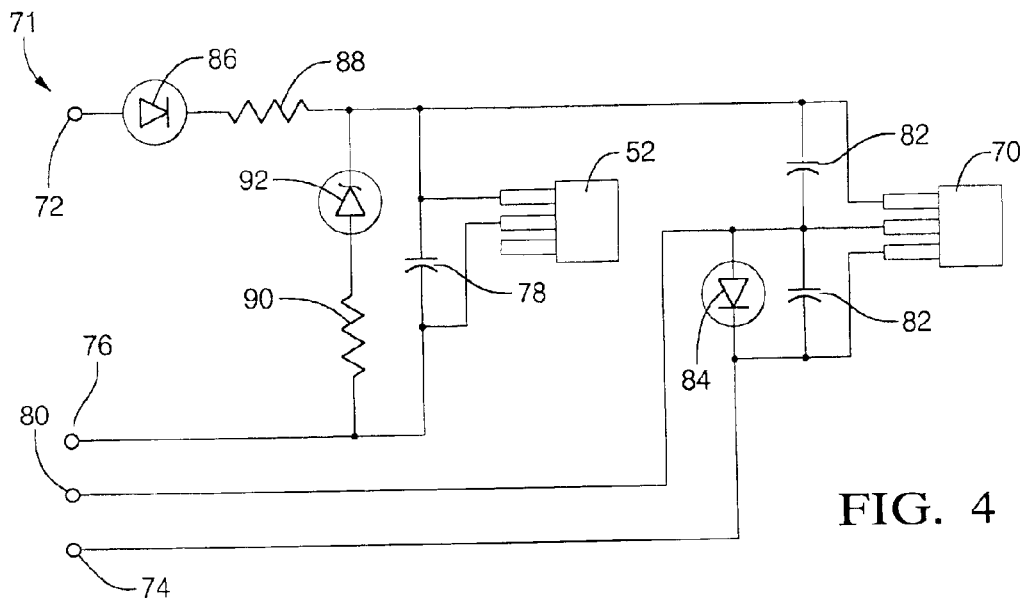
FIG. 4 is a schematic diagram of a circuit for the seat restraint buckle and tension sensing assembly of FIGS. 2 and 3.

As illustrated in FIG. 4, an electrical circuit, generally indicated at 71, of the seat restraint buckle and tension sensing assembly 10 is shown. The electrical circuit 71 includes an electrical power supply 72 also known as "Vref", which is common for the two Hall effect sensors 52 and 70. The electrical circuit 71 also includes a ground 74, which is common for both Hall effect sensors 52 and 70. The electrical circuit 71 includes a buckle switch signal 76 connected to the Hall effect sensor 52 and the power supply 72 with a capacitor 78 therebetween. The electrical circuit 71 further includes a belt tension sensor signal 80 connected to the Hall effect sensor 70 and capacitors 82 interconnecting the belt tension sensor signal 80 and the power supply 72 and ground 74. The electrical circuit 71 also includes a diode 84 in parallel with the capacitor 82 interconnecting the belt tension sensor signal 80 and the ground 74. The electrical circuit 71 includes a diode 86 and resistor 88 in series along the power supply 72 before the Hall effect sensors 52 and 70. The electrical circuit 71 further includes a resistor 90 and diode 92 in series and in parallel with the capacitor 78 and interconnecting the ground 74 and the power supply 72. It should be appreciated that the Hall effect sensors 52 and 70 operate independently, but use a common reference voltage source or power supply 72, thereby simplifying the electrical interface.

In operation of the seat restraint buckle and tension sensing assembly 10, when the latch plate 22 is not latched with the buckle assembly 24 as illustrated in FIG. 2, no signal is transmitted by the Hall effect sensor 52. It should be appreciated that the slider 42 is used to hold the latch member 36 away from the Hall effect sensor 52. It should also be appreciated that when the seat restraint system 12 is unbuckled, there is no tension present in the belt webbing 24 and the springs 66 are fully extended and both magnets 68 are in close proximity on either side of the analog Hall effect sensor 70 in a pull-pull arrangement to economize packaging space.

When the occupant buckles the seat restraint system 12, the latch plate 22 is inserted into the open end 34 of the housing 28 and pushes the slider 42 longitudinally rearward and out of the way. The latch member 36 moves up into position when it is positively engaged in the slot of the latch plate 22. The magnet 50 attached to the latch member 36 then moves in close proximity to the Hall effect sensor 52, causing the output to toggle. It should be appreciated that the slider 42 prevents the magnet 50 from toggling the Hall effect sensor 52 when the seat belt is unbuckled.

When buckled, the tension in the belt webbing 24 may be lower than a predetermined load required to deflect the springs 66 as illustrated in FIG. 3. In this state, the Hall effect sensor 70 transmits power to the electronics, causing a controller (not shown) to determine that a normal or large mass adult is present in the seat 18. It should be appreciated that the seat restraint system 12 is in a low-tension condition as illustrated in FIG. 3.

When a child seat (not shown) is placed in the seat 18 and the seat restraint system 12 is buckled, the seat belt webbing 24 is cinched to pull the child seat tightly into the seat 18. As the tension is increased in the seat belt webbing 24, the contact force on the actuator 58 increases. The resistive force of the springs 66 reacts against the increased tension. When the tension in the belt webbing 24 is higher than a predetermined load or level, the actuator 58 moves as the springs 66 are compressed, thereby moving the magnets 68 farther away from the Hall effect sensor 70 in a pull-pull arrangement for a high-tension condition. This changes the output of the Hall effect sensor 70, causing the controller to determine that a child seat is present in the seat 18. It should be appreciated that the output of the analog Hall effect sensor 70 is proportional to the tension on the belt webbing 24. It should also be appreciated that an audible tone or visual indication may be provided when the tension in the belt webbing 24 is increased above a predetermined level.

Figure 5:
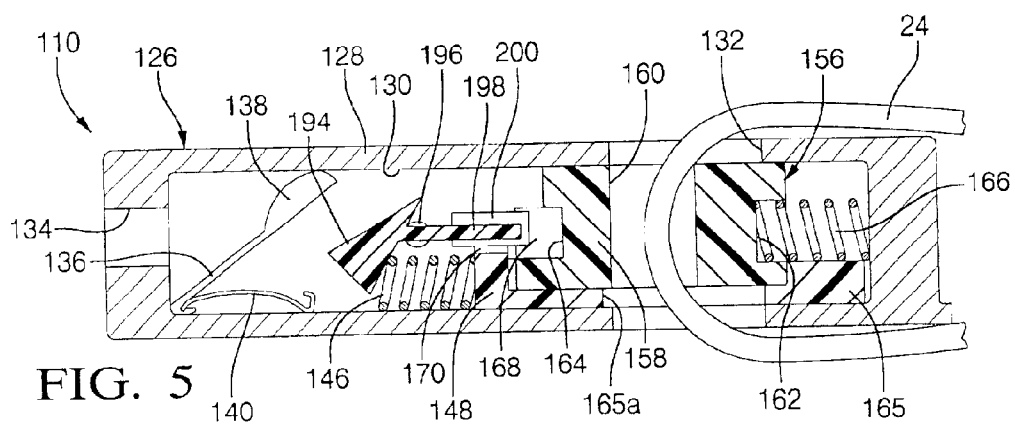
FIG. 5 is a fragmentary elevational view of another embodiment, according to the present invention, of the seat restraint buckle and tension sensing assembly of FIG. 1 illustrating a pre-latched condition.
Figure 6:
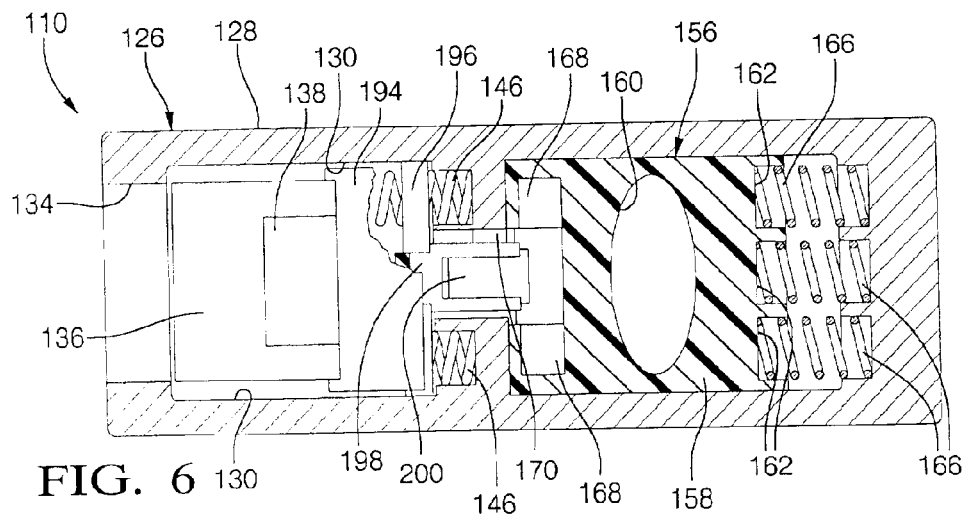
FIG. 6 is a fragmentary plan view of the seat restraint buckle and tension sensing assembly of FIG. 5 illustrating a pre-latched condition.
Figure 7:
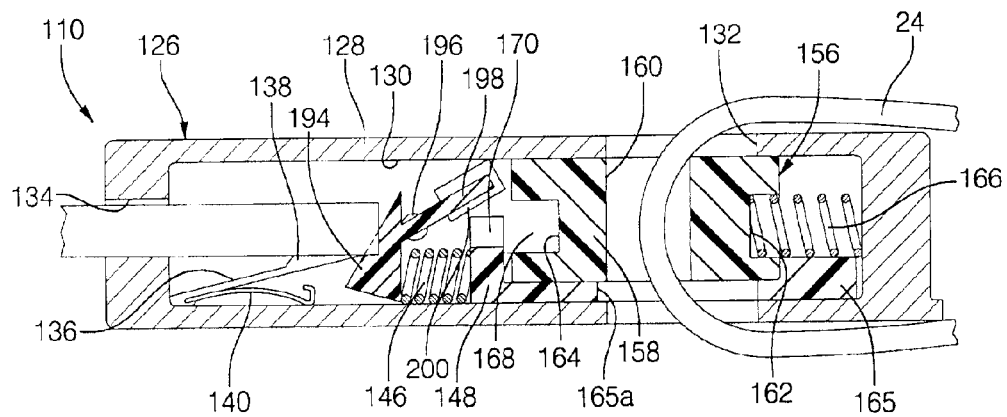
FIG. 7 is a view similar to FIG. 5 illustrating the seat restraint buckle and tension sensing assembly in a latched condition.
Figure 8:
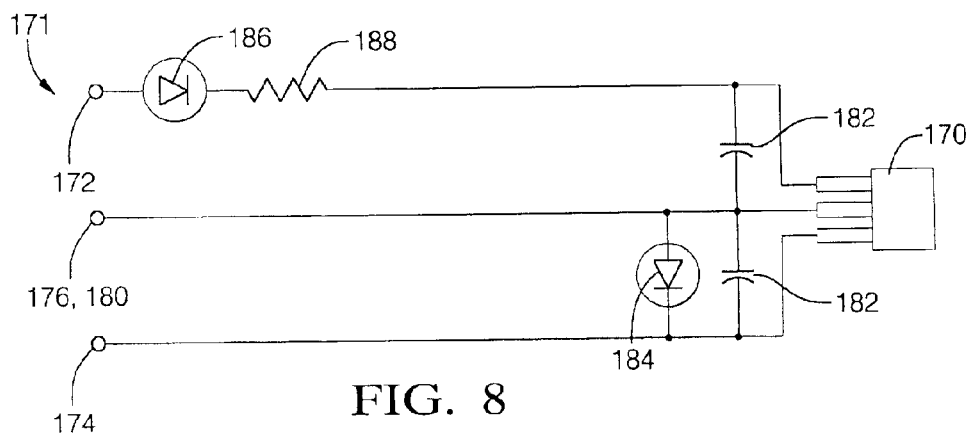
FIG. 8 is a schematic diagram of a circuit for the seat restraint buckle and tension sensing assembly of FIGS. 5 through 7.

Referring to FIGS. 5 through 8, another embodiment, according to the present invention, of the seat restraint buckle and tension sensing assembly 10 is shown. Like parts of the seat restraint buckle and tension sensing assembly 10 have like reference numerals increased by one hundred (100). In this embodiment, the seat restraint buckle and tension sensing assembly 110 eliminates the discrete Hall effect sensor 52, and uses the latch member 136 to move a magnetic shield 200 to be described away from the analog Hall effect sensor 170. The seat restraint buckle and tension sensing assembly 110 includes the buckle assembly 126 and the tension sensing assembly 156. The buckle assembly 126 includes a rotatable or pivot member 194 pivotally connected to the housing 128 by suitable means such as a pin or axle 196. The pivot member 194 has an extension 198 extending longitudinally. The buckle assembly 126 also includes a magnetic shield 200 connected to the extension 198 to shield the Hall effect sensor 170 in an unbuckled position as illustrated in FIG. 5. The magnetic shield 200 is made of a metal material, preferably a magnetic shielding metal material. It should be appreciated that the elimination of the discrete Hall effect sensor 52 simplifies the electrical circuit to a three-wire interface as illustrated in FIG. 8.

In operation of the seat restraint buckle and tension sensing assembly 110, when the latch plate 22 is not latched with the buckle assembly 126 as illustrated in FIGS. 5 and 6, no signal is transmitted by the Hall effect sensor 170. The pivot member 194 is held in place with the spring 146 and the magnetic shield 200 is held in place over the Hall effect sensor 170. It should be appreciated that the actuator 158 of the tension sensing assembly 156 is spring loaded to an initial position by the springs 166.

When the occupant buckles the seat restraint system 12, the latch plate 22 is inserted into the open end 134 of the housing 128. The pivot member 194 rotates on the axle 196 and compresses the spring 146, removing the magnetic shield 200 and permitting the magnets 168 in the actuator 158 to exert a magnetic field across the Hall effect sensor 170 as illustrated in FIG. 7.

When the occupant buckles the seat restraint system 12, the tension in the belt webbing 24 may be lower than a predetermined load required to deflect the springs 166. In this state, the Hall effect sensor 160 and the magnets 168 are disposed next to one another, causing the controller to determine that a normal or large mass adult is present in the seat 18. It should be appreciated that the seat restraint system 12 is in a low-tension condition.

When a child seat (not shown) is placed in the seat 18 and the seat restraint system 12 is buckled, the seat belt webbing 24 is cinched to pull the child seat tightly into the seat 18. As the tension is increased in the seat belt webbing 24, the contact force on the actuator 158 increases. The resistive force of the springs 166 reacts against the increased tension. When the tension in the belt webbing 24 is higher than the predetermined load, the actuator 158 moves as the springs 166 are compressed, thereby moving the magnets 168 farther away from the Hall effect sensors 170 in a pull-pull arrangement for a high tension condition. The relative distance between the magnets 168 and the Hall effect sensor 170 changes the output of the Hall effect sensor 170. Changes in the output of the Hall effect sensor 170 result in corresponding changes of voltage that is transferred to the controller, causing the controller to determine that a child seat is present in the seat 18. It should be appreciated that an audible tone or visual indication may be provided when the tension in the belt webbing 24 is increased above a predetermined level.

Figure 9:
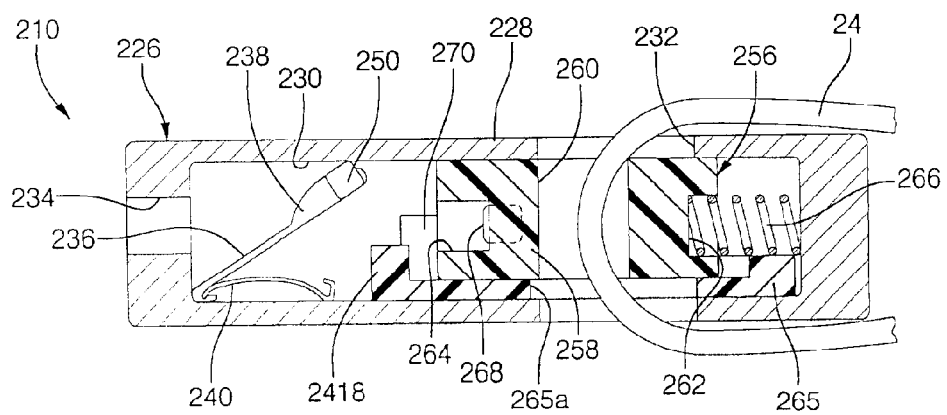
FIG. 9 is a fragmentary elevational view of yet another embodiment, according to the present invention, of the seat restraint buckle and tension sensing assembly of FIG. 1 illustrating a pre-latched condition.
Figure 10:
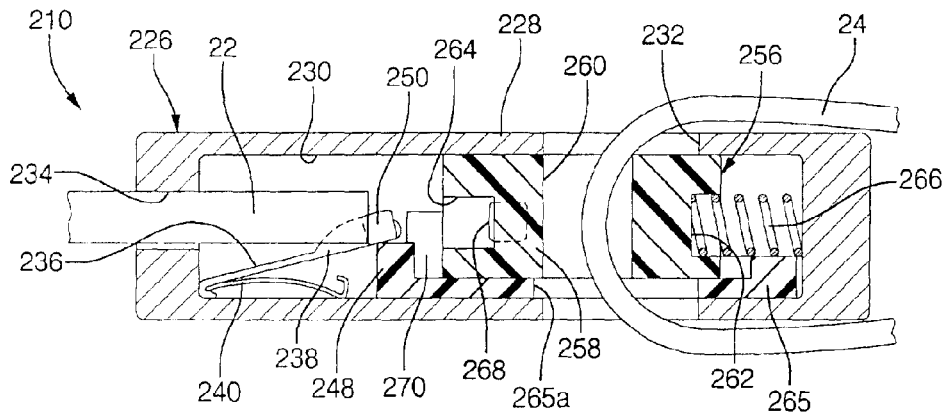
FIG. 10 is a view similar to FIG. 9 illustrating the seat restraint buckle and tension sensing assembly in a latched condition having a low-tension condition.
Figure 11:
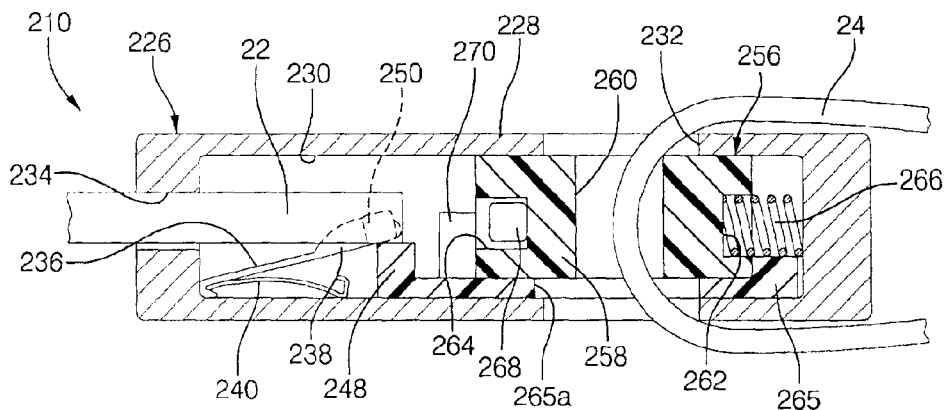
FIG. 11 is a view similar to FIG. 9 illustrating the seat restraint buckle and tension sensing assembly in a latched condition having a high-tension condition.

Referring to FIGS. 9 through 11, yet another embodiment, according to the present invention, of the seat restraint buckle and tension sensing assembly 10 is shown. Like parts of the seat restraint buckle and tension sensing assembly 10 have like reference numerals increased by two hundred (200). In this embodiment, the seat restraint buckle and tension sensing assembly 210 uses a moving magnet 250 and a moving analog Hall effect sensor 270. The seat restraint buckle and tension sensing assembly 210 includes the buckle assembly 226 and the tension sensing assembly 256. The tension sensing assembly 256 includes the Hall effect sensor 270 attached to a forward longitudinal end of the actuator 258. It should be appreciated that the electrical circuit 271 for the seat restraint and tension sensing assembly 210 is similar to the electrical circuit 171 for the seat restraint and tension sensing assembly 110.

In operation of the seat restraint buckle and tension sensing assembly 210, when the latch plate 22 is not latched with the buckle assembly 226 as illustrated in FIG. 9, no signal is transmitted by the Hall effect sensor 270. The magnet 250 attached to the latch member 236 is held away from the Hall effect sensor 270, causing it to default to the low output. It should be appreciated that the actuator 258 of the tension sensing assembly 256 is spring loaded to an initial position by the springs 266.

When the occupant buckles the seat restraint system 12, the latch plate 22 is inserted into the open end 234 of the housing 228. The latch plate 22 moves the latch member 236 and the magnet 250 in close proximity to the Hall effect sensor 270 to influence the Hall effect sensor 270 as illustrated in FIG. 10.

When the occupant buckles the seat restraint system 12, the tension in the belt webbing 24 may be lower than a predetermined load required to deflect the springs 266. In this state, the Hall effect sensor 270 is disposed in close proximity to the magnet 250 as illustrated in FIG. 10, causing the controller to determine that a normal or large mass adult is present in the seat 18. It should be appreciated that the seat restraint system 12 is in a low-tension condition.

When a child seat (not shown) is placed in the seat 18 and the seat restraint system 12 is buckled, the seat belt webbing 24 is cinched to pull the child seat tightly into the seat 18. As the tension is increased in the seat belt webbing 24, the contact force on the actuator 258 increases. The resistive force of the springs 266 reacts against the increased tension. When the tension in the belt webbing 24 is higher than the predetermined load, the actuator 258 moves as the springs 266 are compressed, thereby moving the Hall effect sensor 270 and magnets 268 farther away from the magnet 250 in a pull-pull arrangement for a high tension condition as illustrated in FIG. 11. The relative distance between the magnets 268 and the Hall effect sensor 270 changes the output of the Hall effect sensor 270. Changes in the output of the Hall effect sensor 270 result in corresponding changes of voltage that is transferred to the controller, causing the controller to determine that a child seat is present in the seat 18. It should be appreciated that, when the seat restraint system 12 is latched, the magnets 250 and 268 are fixed in position and the Hall effect sensor 270 is moved with the actuator 258. It should also be appreciated that an audible tone or visual indication may be provided when the tension in the belt webbing 24 is increased above a predetermined level.

Figure 12:
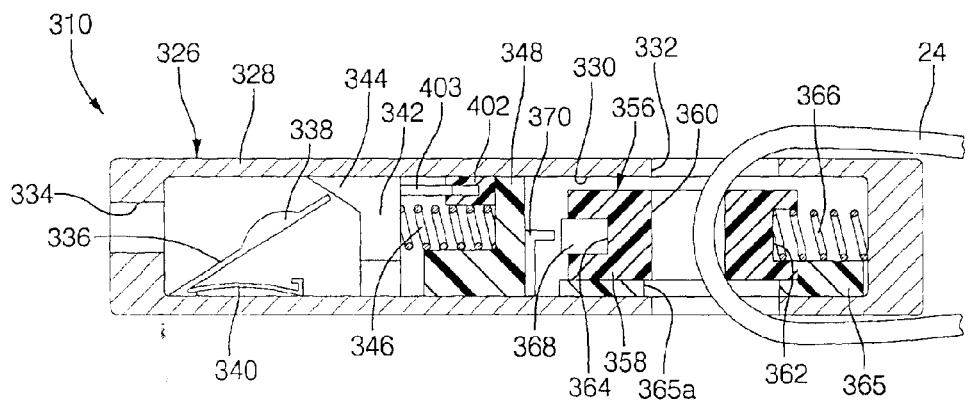
FIG. 12 is a fragmentary elevational view of still another embodiment, according to the present invention, of the seat restraint buckle and tension sensing assembly of FIG. 1 illustrating a pre-latched condition.
Figure 13:
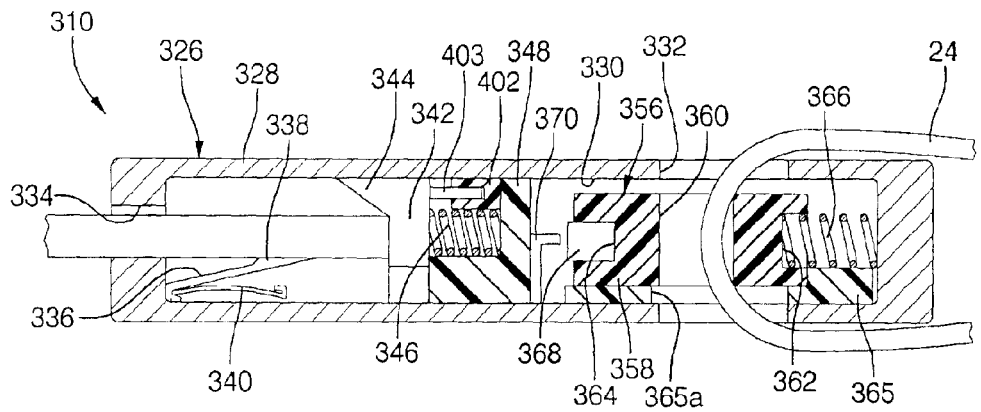
FIG. 13 is a view similar to FIG. 12 illustrating the seat restraint buckle and tension sensing assembly in a latched condition.
Figure 14:
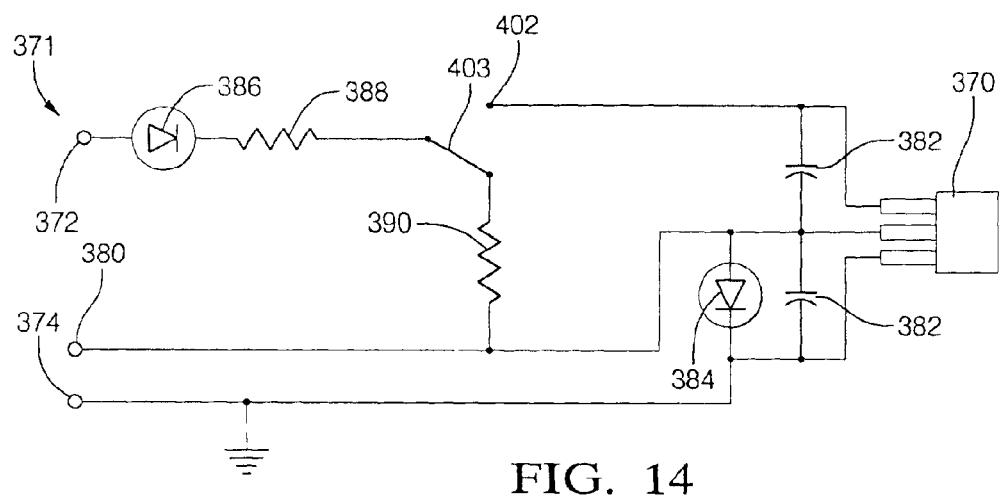
FIG. 14 is a schematic diagram of a circuit for the seat restraint buckle and tension sensing assembly of FIGS. 12 and 13.

Referring to FIGS. 12 through 14, still another embodiment, according to the present invention, of the seat restraint buckle and tension sensing assembly 10 is shown. Like parts of the seat restraint buckle and tension sensing assembly 10 have like reference numerals increased by three hundred (300). In this embodiment, the seat restraint buckle and tension sensing assembly 310 incorporates an electro-mechanical switch to indicate the status of the seat belt latch. The seat restraint buckle and tension sensing assembly 310 includes the buckle assembly 326 and the tension sensing assembly 356. The buckle assembly 326 includes a switch contact 402 connected to the wall 348 and a plunger 403 extending longitudinally rearward from the slider 342 and cooperating with the switch contact 402. The electrical circuit 371 for the seat restraint buckle and tension sensing assembly 310 is illustrated in FIG. 14.

In operation of the seat restraint buckle and tension sensing assembly 310, when the latch plate 22 is not latched with the buckle assembly 326 as illustrated in FIG. 12, the electromechanical switch formed by the switch contact 402 and plunger 403 is open and the switch load shunts across the Hall effect sensor 370, effectively eliminating it from the circuit 371 as illustrated in FIGS. 12 and 14. It should be appreciated that the slider 342 is used to hold the latch member 336 in position. It should be appreciated that when the seat restraint system 12 is unbuckled, there is no tension present in the belt webbing 24 and the springs 366 are fully extended and both magnets 368 are in close proximity on either side of the analog Hall effect sensor 370 in a pull-pull arrangement to economize packaging space.

When the occupant buckles the seat restraint system 12, the latch plate 22 is inserted into the open end 334 of the housing 328 and pushes the slider 342 longitudinally rearward and out of the way. The latch member 336 moves down into position when it is positively engaged in the slot of the latch plate 22. The plunger 403 and switch contact 402 make contact, closing the switch to provide power to the Hall effect sensor 370.

When buckled, the tension in the belt webbing 24 may be lower than a predetermined load required to deflect the springs 366. In this state, the Hall effect sensor 370 transmits power to the electronics, causing a controller (not shown) to determine that a normal or large mass adult is present in the seat 18. It should be appreciated that the seat restraint system 12 is in a low-tension condition.

When a child seat (not shown) is placed in the seat 18 and the seat restraint system 12 is buckled, the seat belt webbing 24 is cinched to pull the child seat tightly into the seat 18. As the tension is increased in the seat belt webbing 24, the contact force on the actuator 358 increases. The resistive force of the springs 366 reacts against the increased tension. When the tension in the belt webbing 24 is higher than the predetermined load, the actuator 358 moves as the springs 366 are compressed, thereby moving the magnets 368 farther away from the Hall effect sensor 370 in a pull-pull arrangement for a high tension condition. This changes the output of the Hall effect sensor 370, causing the controller to determine that a child seat is present in the seat 18. It should be appreciated that the output of the analog Hall effect sensor 370 is proportional to the tension on the belt webbing 24. It should also be appreciated that an audible tone or visual indication may be provided when the tension in the belt webbing 24 is increased above a predetermined level.

Referring to FIGS. 15 and 16, a further embodiment, according to the present invention, of the seat restraint buckle and tension sensing assembly 10 is shown. Like parts of the seat restraint buckle and tension sensing assembly 10 have like reference numerals increased by four hundred (400). In this embodiment, the seat restraint buckle and tension sensing assembly 410 includes the buckle assembly 426 and the tension sensing assembly 456. The buckle assembly 426 includes a rotatable or pivot member 494 pivotally connected to the housing 428 by suitable means such as a pin or axle (not shown). The pivot member 494 has an extension 498 extending longitudinally to cooperate with the spring 446. The buckle assembly 426 also includes a magnetic shield 500 connected to the pivot member 494 to shield the Hall effect sensor 470 in an unbuckled position. The magnetic shield 500 is made of a metal material, preferably a magnetic shielding metal material. The buckle assembly 426 includes a switch contact 502 connected to the housing 428 and a plunger 503 cooperating with the switch contact 502 and the pivot member 494. It should be appreciated that the electrical circuit (not shown) for the seat restraint and tension sensing assembly 410 is similar to the electrical circuit 371 for the seat restraint and tension sensing assembly 310.

In operation of the seat restraint buckle and tension sensing assembly 410, when the latch plate 22 is not latched with the buckle assembly 426 as illustrated in FIG. 15, no signal is transmitted by the Hall effect sensor 470. The pivot member 494 is held in place with the spring 446 and the magnetic shield 500 is held in place over the Hall effect sensor 470. The electromechanical switch formed by the switch contact 502 and plunger 503 is open and the switch load shunts across the Hall effect sensor 470, effectively eliminating it from the circuit. It should be appreciated that the actuator 458 of the tension sensing assembly 456 is spring loaded to an initial position by the springs 466.

When the occupant buckles the seat restraint system 12, the latch plate 22 is inserted into the open end 434 of the housing 428. The pivot member 494 rotates on the axle and compresses the spring 446, removing the magnetic shield 200 and permitting the magnets 468 in the actuator 458 to exert a magnetic field across the Hall effect sensor 470 as illustrated in FIG. 16. Also, when the pivot member 494 rotates, the plunger 503 and switch contact 502 make contact, closing the switch to provide power to the Hall effect sensor 470.

When the occupant buckles the seat restraint system 12, the tension in the belt webbing 24 may be lower than a predetermined load required to deflect the springs 466. In this state, the Hall effect sensor 470 and the magnets 468 are disposed next to one another, causing the controller to determine that a normal or large mass adult is present in the seat 18. It should be appreciated that the seat restraint system 12 is in a low-tension condition.

When a child seat (not shown) is placed in the seat 18 and the seat restraint system 12 is buckled, the seat belt webbing 24 is cinched to pull the child seat tightly into the seat 18. As the tension is increased in the seat belt webbing 24, the contact force on the actuator 458 increases. The resistive force of the springs 466 reacts against the increased tension. When the tension in the belt webbing 24 is higher than the predetermined load, the actuator 458 moves as the springs 466 are compressed, thereby moving the magnets 468 farther away from the Hall effect sensors 470 in a pull-pull arrangement for a high tension condition. The relative distance between the magnets 468 and the Hall effect sensor 470 changes the output of the Hall effect sensor 470. Changes in the output of the Hall effect sensor 470 result in corresponding changes of voltage that is transferred to the controller, causing the controller to determine that a child seat is present in the seat 18. It should be appreciated that an audible tone or visual indication may be provided when the tension in the belt webbing 24 is increased above a predetermined level.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat restraint buckle and tension sensing assembly for a seat restraint system in a vehicle comprising:
    a buckle assembly having a housing for receiving a portion of a latch plate of the seat restraint system, said buckle assembly sensing latching of the latch plate; and
    a tension sensing assembly disposed in said housing and cooperating with belt webbing of the seat restraint system for sensing a tension level in the seat restraint system wherein said tension sensing assembly comprises a movable actuator attached to the belt webbing.

2. A seat restraint buckle and tension sensing assembly as set forth in claim 1 wherein said tension sensing assembly comprises at least one magnet mounted to said actuator and at least one Hall effect sensor mounted to said housing, said actuator moving said at least one magnet relative to said at least one Hall effect sensor to change an output of said at least one Hall effect sensor.

3. A seat restraint buckle and tension sensing assembly as set forth in claim 1 wherein said tension sensing assembly comprises at least one Hall effect sensor mounted to said actuator.

4. A seat restraint buckle and tension sensing assembly as set forth in claim 1 including at least one spring disposed in said housing between said actuator and a wall of said housing.

5. A seat restraint buckle and tension sensing assembly as set forth in claim 1 wherein said actuator has a first cavity at one longitudinal end and a second cavity at a second longitudinal end and an aperture extending therethrough and spaced longitudinally between said first cavity and said second cavity.

6. A seat restraint buckle and tension sensing assembly as set forth in claim 5 including at least one spring partially disposed in said first cavity and at least one magnet disposed in said second cavity.

7. A seat restraint buckle and tension sensing assembly as set forth in claim 1 including a bearing plate disposed between said actuator and said housing, said bearing plate being fixed to said housing and said actuator sliding on said bearing plate.

8. A seat restraint buckle and tension sensing assembly as set forth in claim 1 wherein said housing includes a cavity therein and an aperture extending therethrough and communicating with said cavity to allow the belt webbing to pass therethrough for attachment to the movable actuator.

9. A seat restraint buckle and tension sensing assembly for a seat restraint system in a vehicle comprising:
    a buckle assembly having a housing for receiving a portion of a latch plate of the seat restraint system, said buckle assembly sensing latching of the latch plate, and
    a tension sensing assembly disposed in said housing and cooperating with belt webbing of the seat restraint system for sensing a tension level in the seat restraint system wherein said buckle assembly includes a movable latch member having one end contacting said housing and extending upwardly to another end, said latch member including a latch portion disposed between the ends thereof and having a generally arcuate shape.

10. A seat restraint buckle and tension sensing assembly as set forth in claim 9 wherein said buckle assembly includes at least one spring contacting said latch member and said housing for urging said latch portion upwardly.

11. A seat restraint buckle and tension sensing assembly as set forth in claim 10 wherein said at least one spring is a leaf spring.

12. A seat restraint buckle and tension sensing assembly as set forth in claim 9 wherein said buckle assembly includes at least one magnet disposed on said latch portion.

13. A seat restraint buckle and tension sensing assembly as set forth in claim 12 wherein said buckle assembly includes at least one Hall effect sensor fixed to said housing and cooperating with said at least one magnet.

14. A seat restraint buckle and tension sensing assembly as set forth in claim 12 wherein said buckle assembly includes at least one Hall effect sensor mounted to a movable actuator in said housing and cooperating with said at least one magnet.

15. A seat restraint buckle and tension sensing assembly as set forth in claim 12 wherein said buckle assembly includes at least one Hall effect sensor fixed to said housing and cooperating with said at least one magnet.

16. A seat restraint buckle and tension sensing assembly as set forth in claim 15 including a switch contact mounted to said housing and a plunger mounted to said slider and cooperating with said switch contact.

17. A seat restraint buckle and tension sensing assembly as set forth in claim 9 including a movable slider cooperating with said latch member and having a flange portion extending longitudinally forward to hold said latch member in a predetermined position.

18. A seat restraint buckle and tension sensing assembly as set forth in claim 17 including at least one spring disposed between said slider and a wall of said housing to urge said slider longitudinally forward toward said latch member.

19. A seat restraint buckle and tension sensing assembly as set forth in claim 9 wherein said buckle assembly includes a pivot member pivotally connected to said housing and having an extension extending therefrom.

20. A seat restraint buckle and tension sensing assembly as set forth in claim 19 wherein said buckle assembly includes at least one spring disposed between said pivot member and a wall of said housing to urge said pivot member toward said latch member.

21. A seat restraint buckle and tension sensing assembly as forth in claim 19 wherein said buckle assembly includes a magnetic shield connected to said extension.

22. A seat restraint buckle and tension sensing assembly as set forth in claim 21 including a switch contact mounted to said housing and a plunger cooperating with said switch contact and said pivot member.

23. A seat restraint buckle and tension sensing assembly as set forth in claim 19 wherein said buckle assembly includes a magnetic shield connected to pivot member.

24. A seat restraint buckle and tension sensing assembly for a seat restraint system in a vehicle comprising:
    a buckle assembly having a housing for receiving a portion of a latch plate of the seat restraint system, said buckle assembly including a movable latch member having one end contacting said housing and extending upwardly to another end, said latch member including a latch portion disposed between the ends thereof and having a generally arcuate shape, at least one spring contacting said latch member and said housing for urging said latch portion upwardly, at least one first magnet disposed on said latch portion, and at least one first Hall effect sensor fixed to said housing and cooperating with said at least one first magnet; and
    a tension sensing assembly disposed in said housing and comprising a movable actuator cooperable with the belt webbing, at least one second magnet mounted to said actuator, and at least one second Hall effect sensor mounted to said housing, said actuator moving said at least one second magnet relative to said at least one second Hall effect sensor to change an output of said at least one second Hall effect sensor for sensing a tension level in the seat restraint system.

25. A seat restraint buckle and tension sensing assembly for a seat restraint system in a vehicle comprising:

a buckle assembly having a housing for receiving a portion of a latch plate of the seat restraint system, said buckle assembly including a movable latch member having one end contacting said housing and extending upwardly to another end, said latch member including a latch portion disposed between the ends thereof and having a generally arcuate shape, at least one spring contacting said latch member and said housing for urging said latch portion upwardly, a pivot member pivotally connected to said housing and having an extension extending therefrom, and a magnetic shield connected to said extension; and a tension sensing assembly disposed in said housing and comprising a movable actuator cooperable with the belt webbing, at least one magnet mounted to said actuator, and at least one Hall effect sensor mounted to said housing, said actuator moving said at least one magnet relative to said at least one Hall effect sensor to change an output of said at least one Hall effect sensor for sensing a tension level in the seat restraint system.

26. A seat restraint buckle and tension sensing assembly for a seat restraint system in a vehicle comprising:

a buckle assembly having a housing for receiving a portion of a latch plate of the seat restraint system, said buckle assembly including a movable latch member having one end contacting said housing and extending upwardly to another end, said latch member including a latch portion disposed between the ends thereof and having a generally arcuate shape, at least one spring contacting said latch member and said housing for urging said latch portion upwardly, and at least one first magnet disposed on said latch portion; and a tension sensing assembly disposed in said housing and comprising a movable actuator cooperable with the belt webbing, at least one second magnet mounted to said actuator and at least one Hall effect sensor mounted to said actuator, said actuator moving said at least one second magnet and said at least one Hall effect sensor to change an output of said at least one Hall effect sensor for sensing a tension level in the seat restraint system.

27. A seat restraint buckle and tension sensing assembly for a seat restraint system in a vehicle comprising:

a buckle assembly having a housing for receiving a portion of a latch plate of the seat restraint system, said buckle assembly including a movable latch member having one end contacting said housing and extending upwardly to another end, said latch member including a latch portion disposed between the ends thereof and having a generally arcuate shape, at least one spring contacting said latch member and said housing for urging said latch portion upwardly, a movable slider cooperating with said latch member and having a flange portion upwardly, a movable slider cooperating with said latch member and having a flange portion extending longitudinally forward to hold said latch member in a predetermined position, and a switch contact mounted to said housing and a plunger mounted to said slider and cooperating with said switch contact; and a tension sensing assembly disposed in said housing and comprising a movable actuator cooperable with the belt webbing, at least one magnet mounted to said actuator, and at least one Hall effect sensor mounted to said housing, said actuator moving said at least one magnet relative to said at least one Hall effect sensor to change an output of said at least one Hall effect sensor for sensing a tension level in the seat restraint system.

28. A seat restraint buckle and tension sensing assembly for a seat restraint system in a vehicle comprising:

a buckle assembly having a housing for receiving a portion of a latch plate of the seat restraint system, said buckle assembly including a movable latch member having one end contacting said housing and extending upwardly to another end, said latch member including a latch portion disposed between the ends thereof and having a generally arcuate shape, at least one spring contacting said latch member and said housing for urging said latch portion upwardly, a pivot member pivotally connected to said housing and having an extension extending therefrom, a magnetic shield connected to pivot member, and a switch contact mounted to said housing and a plunger cooperating with said switch contact and said pivot member; and a tension sensing assembly disposed in said housing and comprising a movable actuator cooperable with the belt webbing, at least one magnet mounted to said actuator, and at least one Hall effect sensor mounted to said housing, said actuator moving said at least one magnet.

* * * * *